United States Patent
Winter et al.

(10) Patent No.: US 6,763,318 B1
(45) Date of Patent: Jul. 13, 2004

(54) DISTANCE SENSOR WITH A COMPENSATION DEVICE FOR AN ANGLE MISALIGNMENT ON A VEHICLE

(75) Inventors: Klaus Winter, Schwieberdingen (DE); Hermann Winner, Karlsruhe (DE); Reiner Marchthaler, Gingen (DE); Jens Lueder, Kornwestheim (DE); Stephan Leinbaum, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 09/869,507
(22) PCT Filed: Sep. 27, 2000
(86) PCT No.: PCT/DE00/03397
  § 371 (c)(1),
  (2), (4) Date: Nov. 2, 2001
(87) PCT Pub. No.: WO01/31362
  PCT Pub. Date: May 3, 2001

(30) Foreign Application Priority Data
Oct. 28, 1999 (DE) .......................................... 199 52 056

(51) Int. Cl.$^7$ ............................................... G01B 5/25
(52) U.S. Cl. ...................... 702/158; 702/159; 702/190; 701/300; 33/288; 356/139.09; 356/342; 356/173
(58) Field of Search ............................ 702/158; 701/70, 701/300, 301, 205, 210; 342/70, 71, 27, 61

(56) References Cited

U.S. PATENT DOCUMENTS

| | | | |
|---|---|---|---|
| 5,832,407 A | * 11/1998 | Kai et al. | 701/205 |
| 6,025,797 A | * 2/2000 | Kawai et al. | 342/70 |
| 6,363,619 B1 | * 4/2002 | Schirmer et al. | 33/288 |
| 6,469,656 B1 | * 10/2002 | Wagner et al. | 342/70 |

FOREIGN PATENT DOCUMENTS

| | | |
|---|---|---|
| DE | 196 10 351 | 9/1996 |
| DE | 196 33 704 | 10/1997 |
| DE | 197 46 524 | 5/1998 |
| DE | 198 33 065 | 1/1999 |
| EP | 0 782 008 | 7/1997 |

* cited by examiner

Primary Examiner—Kamini Shah
(74) Attorney, Agent, or Firm—Kenyon & Kenyon

(57) ABSTRACT

A distance sensor having a sensor for a motor vehicle in which an arrangement is provided by which gnment angles and trajectory curvatures can be compensated for during travel not only on a straight road but also along curves. In a sensor mounted displaced from the center line of the vehicle, an angle (alpha_sensor) is measured which cuts the projected center line of the motor vehicle at the target object, a vehicle driving ahead. By the additional use of a yaw rate sensor, curve curvatures of the road are also compensated for, so that angle and distance measurement can also be made along curves.

9 Claims, 2 Drawing Sheets

DISTANCE SENSOR WITH A COMPENSATION DEVICE FOR AN ANGLE MISALIGNMENT ON A VEHICLE

FIELD OF THE INVENTION

The present invention relates to a distance sensor for a vehicle having a sensor for transmitting microwaves or light, or for receiving an echo signal reflected by a target object.

BACKGROUND INFORMATION

In the case of speed regulators having a distance sensor (Adaptive Cruise Control, ACC) adapting travel speed of a motor vehicle to slower vehicles traveling ahead, when these are detected by the distance sensor, is already known. However, the distance sensor has a limited detection range, and thus can only detect such vehicles as are located in the prospective course range of the following vehicle. A misalignment of this detection range, which can occur either during installation on the vehicle or during operation, has the effect, however, that the longitudinal axis of the distance sensor relatively to the nominal alignment (center line of the vehicle) has a systematic angle of deviation. This can have the result that this misalignment, for example, leads to a faulty lane assignment of a detected radar object on the path of motion of the motor vehicle (trajectory), that is, to a vehicle being followed or coming in the opposite direction, and that thereby an undesired reaction of the speed regulator can take place.

A compensating device is known, for example, from German Published Patent Application No. 197 46 524, for compensating for the installation tolerances of a distance sensor in a vehicle, in which the installation tolerances of a distance sensor are compensated. Using an electronic evaluation device, current object distances and a current object angle are measured during travel, for detected objects relatively to the vehicle axis. In this connection, the misalignment angle to the current target object is determined by forming an average value of many measurements. It is true, though, that this average value formation functions satisfactorily only if the vehicle can follow the target object, a second vehicle traveling ahead, on a sufficiently long straight path, so that frequent measurements to the target object can be carried out. In the case of curves in the road or, also, uphill and down dale travel with changing angle of altitude, this method fails.

On the other hand, in the case of the device for calculating and correcting a misalignment angle for a distance sensor according to European Published Patent Application No. 0 782 008 the angle of deviation from the center line is described, using a regression method. To do this, the angle is measured in each measurement cycle as a function of the distance from moving, or better still, from fixed radar objects. In particular in dense traffic, however, there are not enough suitable objects within sight range of the sensor, so that not enough measured values are available. Thus, each method has the disadvantage that the availability of measured values depends on the travel situation or the traffic situation, as the case may be.

SUMMARY OF THE INVENTION

By comparison, the distance sensor or the speed regulator according to the present invention has the advantage that the reliability of the misalignment identification increases by the combination of a plurality of methods for determining a misalignment angle.

A particular advantage as compared to the known related art is considered also to be that the measurements for the misalignment angle can be carried out, not only on a straight travel path, but also along a curve. More measured values result from this, which, in particular, also favor the formation of the average value.

It is especially advantageous that a yaw rate sensor is provided as a further instrument, whose signals can be used for correcting trajectory curves. Since the yaw rate sensor detects the rotary motion of the vehicle about the vertical axis, it thereby also detects, in consideration of the driving speed, the bend in the travel path, or the curve, so that, from these data, appropriate angle calculations with respect to a vehicle driving ahead, which has been detected by the sensor, can be carried out The bend of a trajectory, in this connection, is looked upon as being the reciprocal value of the radius of the path, (in English: the curvature).

With the aid of adaptive long-term filtering, quality indicators of the trajectory are ascertained from the ascertained misalignment angles of individual trajectories. With the aid of the quality indicators of the trajectory, reliability of the angle measurement is advantageously improved. In this case, for example, the determination of the quality indicators is made from the correlation value of a regression analysis of the curvature, the number of measured values, the length of the trajectory and/or the speed of the object. Since these parameters are relatively simple to measure, this also makes possible a simple calculation of the quality indicator.

For the application of adaptive long-term filtering of the ascertained misalignment angle from individual trajectories, for example, a noise-optimized, linear, adaptive filter (e.g. a Kalman filter) is suitable, or a nonlinear filter in which the weighting of the individual measured values from the quality valuation is based on the quality indicators of the trajectory.

A nonlinear filter can also be used as a suitable adaptive long-term filter, in which the weighting of the individual measured values is done from the quality appraisal.

It is regarded as a special advantage that, with a positioning of the sensor outside the center line of the motor vehicle, the control system ascertains the misalignment angle with respect to the center line of the motor vehicle. That also causes the lateral angle arising from the center displacement of the sensor to be compensated for.

It is also favorable that the ascertainment of the misalignment angle is weighted either as a function of the weighted average values of the yaw rate sensor or of the displacement from the center line. This yields an improvement in the signal quality, which improves the robustness of the method for determining the misalignment angle, depending on the availability of the individual systems, since almost always at least one of the two methods receives suitable input data. Thereby one method advantageously compensates for the weaknesses of the other method.

By weighting the averaged mean values of the two individual methods, one obtains an improved signal quality.

DETAILED DESCRIPTION

Figure 1:
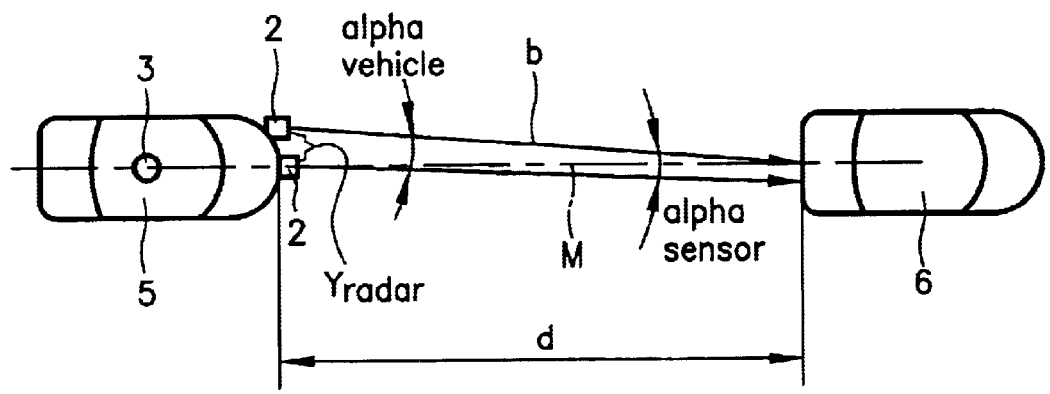
FIG. 1 shows a first diagram with angle representations of ray paths.

As FIG. 1 shows two motor vehicles 5, 6 which are traveling along on a road one behind the other at a distance d, the assumption being that motor vehicle 5 is behind motor vehicle 6. Furthermore, for reasons of clarity, only the middle rays of a sensor 2 are illustrated, not the entire radiation in the radiation range. It is also assumed in the exemplary embodiment that, in a first embodiment variant, a sensor 2 is mounted centrically on the front face of motor vehicle 5. It is aligned in such a way that its middle ray detects the rear end of motor vehicle 6 driving ahead. On account of an assumed misalignment, the transmitted ray does not hit the rear end along the center line of motor vehicle 5, but rather displaced by an average angle alpha__sensor. For the sake of completeness, let it be mentioned that this reflected ray is received by a corresponding receiving device of sensor 2 and evaluated. Such an evaluation method is known, for example, from German Published Patent Application No. 197 46 524. In the exemplary embodiment according to the present invention, the sensor is not positioned centrically but laterally displaced by a distance $y_{radar}$. With this sensor 2, now, the central ray b hits the projected center line of motor vehicle 5 at the rear end of target object 6 at an angle alpha__vehicle. From this positioning displaced from the center by the distance $y_{radar}$, and the distance d to vehicle 6 driving ahead, an angle can now be determined according to the equation alpha__vehicle=alpha__sensor+$y_{radar}$/d.

This angle alpha__vehicle is ascertained by repeated measurements during the trip and suitable long-term filtering. Using this systematic deviation, the angle measurement of sensor 2 can be corrected.

Carried out principally on a straight stretch of road, this method of compensating the misalignment angle by averaging the current target object angle over a plurality of measurements is less applicable in curves of the road, since there, the target "vehicle 6, driving ahead" is constantly changing the relative vehicle position with respect to sensor 2, because of the radius of curvature. To compensate for the error caused by the radius of curvature of the road, a yaw rate sensor 3 is provided on motor vehicle 5 to detect the change of direction of motor vehicle 5 about its vertical axis. Using the normalized signal from yaw rate sensor 3 and the angle alpha__vehicle, the result is an average deviation of the curvature-corrected angle according to the formula, $d_{alpha\_object}$=average value(alpha__vehicle-$d^2$*yaw rate/(2*vehicle speed)), where $d_{alpha\_object}$ corresponds to the corrected angle and the yaw rate corresponds to the signal of yaw rate sensor 3.

Figure 3:
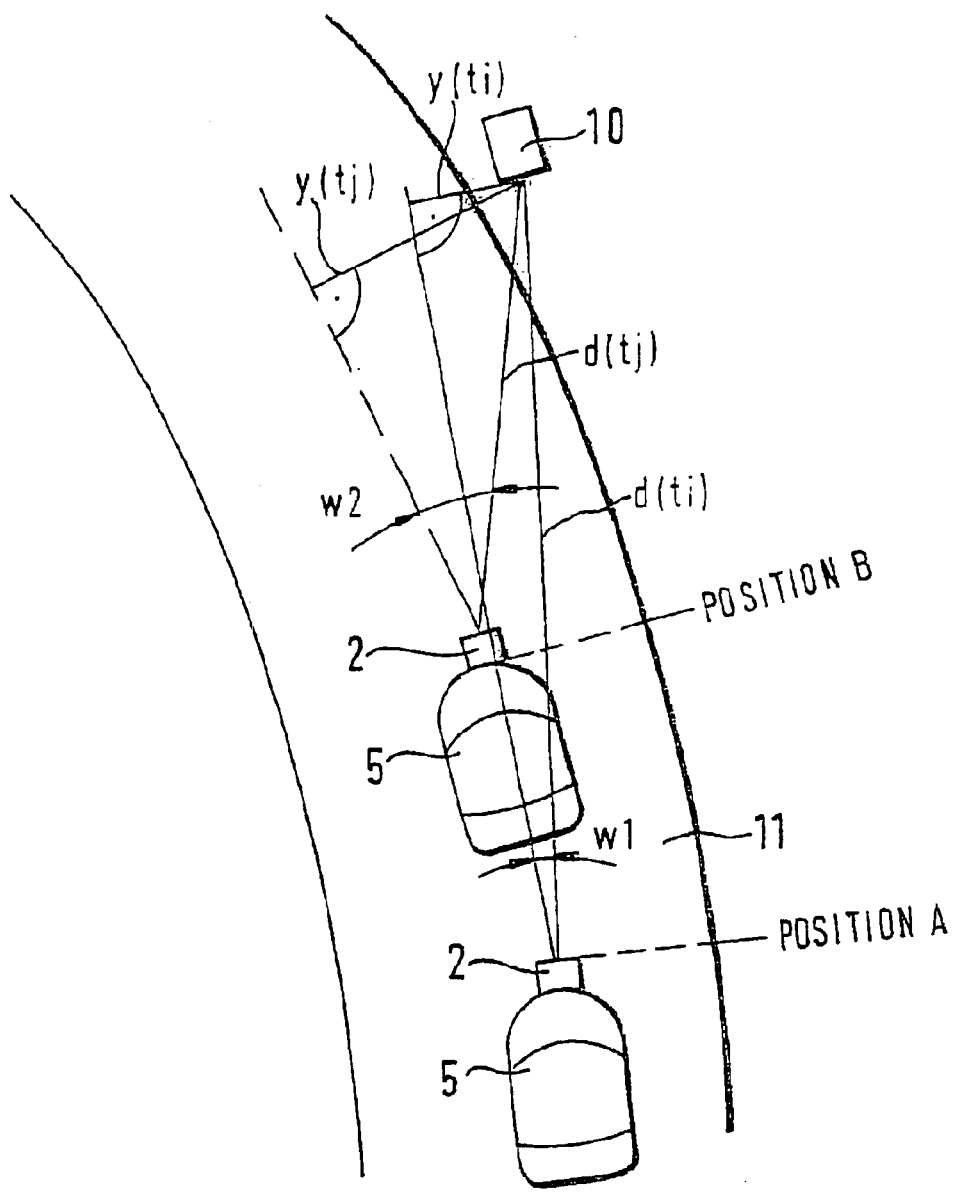
FIG. 3 shows a second diagram.

The averaging is to be carried out by a long-term low-pass filter. Furthermore, depending on the frequency of the averaging, for the magnitude $d_{alpha\_object}$ a quality value $q_{object}$ can be given for the reliability of the angle. Since a curve 11 in a road can be set into a plurality of trajectories, there is a further possibility, when determining the misalignment angle, of applying a regression method known per se, as described, for instance, in European Published Patent Application No. 0 782 008. According to the present invention, as shown in FIG. 3, in dependence on the distance to a moving, or better still, standing target object 10, as, for example, a crash barrier part or a post, angles w1 or w2 respectively, depending on position A or B of vehicle 5, are measured in curve 11. From the distance d(ti) or d(tj) at point in time ti (position A) or ti (position B) of vehicle 5, for instance, to standing target 10, a lateral displacement y(ti) or y(tj) can be calculated by simple trigonometrical conversion. In contrast to the known method, this advantageously yields additional measuring points within sensor 2, for travel in a curve. It is therefore proposed by the present invention also to combine this method of regression analysis of trajectories with yaw rate signal 3, in order to compensate for the trajectory curvatures. The measured values thus obtained are averaged by adaptive long-term filtering of the ascertained misalignment angles of single trajectories. A noise-optimized, linear adaptive filter, for example a Kalman filter, can be used as the suitable filter. Alternatively, a nonlinear filter can also be used, in which the weighting of the individual measured value is founded on the quality assessment, which is based on quality indicators of the trajectory. The quality indicators are formed, for instance, from the correlation value of the regression analysis, from the curvature, number of measured points, trajectory length and object speed.

As a result, a sliding long-term filtered misalignment angle $d_{alpha\_traj}$ or a quality value $q_{traj}$ is ascertained for the reliability of the angle, or rather is updated with each analyzed trajectory.

Since this second method also does not always yield suitable trajectories, particularly in heavy columnar traffic, in an alternative solution both approaches are advantageously linked to each other. Depending on the reliability of the individual methods, the weightings of the approaches can be varied statically or dynamically. The linking of the two approaches takes place via a weighted average value of both individual methods. The weights are determined from the quality numbers:

$d_{alpha}=G1(q\_traj)*d_{alpha\_traj}+G2(q\_obj)*d_{alpha\_obj}$.

where G1(q__traj) and G2(q__obj) are the weights from the quality numbers. In this respect, Q__traj and q__obj form the quality numbers Qi.

By the introduction of quality numbers Qi for each method, with a decrease in Qi in case no input variable is available for the method in the current cycle, and an increase in case input variables are available, a simple possibility of selection was found as to which of the two methods is delivering, at the moment, the more reliable statement concerning the current angle measurement. Besides the improvement of the signal quality by the combination, the robustness of the methods increases also, since almost always at least one of the two methods contains suitable input data, that means, that one method compensates for the weaknesses of the other method.

Figure 2:
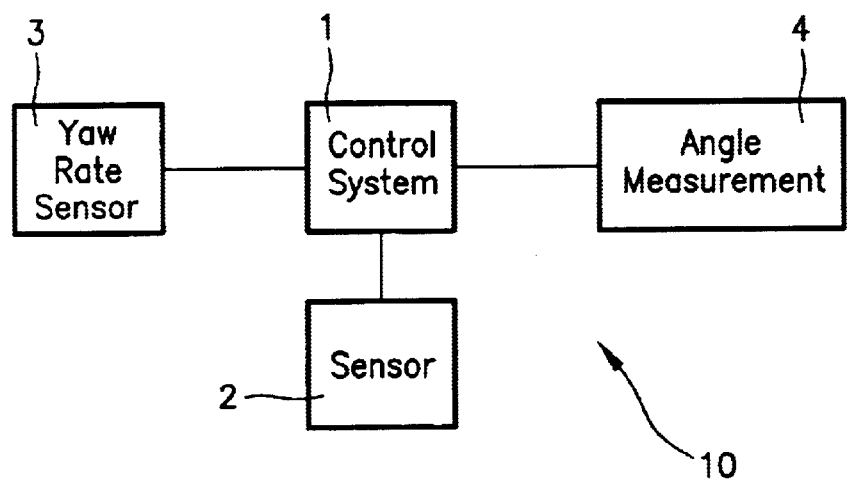
FIG. 2 shows a block diagram of a distance sensor.

FIG. 2 shows a block diagram of distance sensor 10, in which control system 1 is connected to sensor 2 and yaw rate sensor 3. There is also provided a compensation device for angle measurement 4, in which, among other things, the calculation of the angles, among other things, is carried out. The above-named calculations are preferably made with a program that is run by the microcomputer of control system 1.

What is claimed is:

1. A distance sensor for a motor vehicle, comprising:
  a sensor element for performing one of:
    transmitting one of microwaves and light, and
    receiving an echo signal reflected by a target object;
  a control system including an arrangement for, during travel on a straight road, using an algorithm to ascertain a misalignment angle of the sensor element with respect to a center axis of the motor vehicle from transmitted and received rays, the arrangement correcting a continuing angle measurement in accordance with the misalignment angle; and an arrangement for compensating for a trajectory for a curvature travel along a curve wherein:

the control system determines a quality indicator of the trajectory from ascertained misalignment angles of individual trajectories in accordance with an adaptive long-term filter; and the adaptive long-term filter is a noise-optimized linear filter.

2. The distance sensor according to claim 1, wherein:

the arrangement for compensating includes a yaw rate sensor that produces a signal capable of correcting the trajectory for the curvature travel.

3. The distance sensor according to claim 1, wherein:

the quality indicator is calculated from a correlation value of a regression analysis of at least one of the curve, a number of measured points, a trajectory length, and an object speed.

4. The distance sensor according to claim 1, wherein:

the noise-optimized linear filter is a Kalman filter.

5. The distance sensor according to claim 2, wherein:

when a positioning of the sensor element occurs outside the center axis of the motor vehicle, the control system ascertains the misalignment angle with respect to the center axis.

6. A distance sensor for a motor vehicle, comprising:

a sensor element for performing one of;
transmitting one of microwaves and light, and
receiving an echo signal reflected by a target object;

a control system including an arrangement for, during travel on a straight road, using an algorithm to ascertain a misalignment angle of the sensor element with respect to a center axis of the motor vehicle from transmitted and received rays, the arrangement correcting a continuing angle measurement in accordance with the misalignment angle; and an arrangement for compensating for a trajectory for a curvature travel along a curve wherein:

the control system determines a quality indicator of the trajectory from ascertained misalignment angles of individual trajectories in accordance with an adaptive long-term filter; and the adaptive long-term filter is a nonlinear filter in which a weighting of individual measured values results from a quality appraisal.

7. A distance sensor for a motor vehicle, comprising:

a sensor clement for performing one of:
transmitting one of microwaves and light, and
receiving an echo signal reflected by a target object;

a control system including an arrangement for, during travel on a straight road, using an algorithm to ascertain a misalignment angle of the sensor element with respect to a center axis of the motor vehicle from transmitted and received rays, the arrangement correcting a continuing angle measurement in accordance with the misalignment angle; and an arrangement for compensating for a trajectory for a curvature travel along a curve; wherein:

the arrangement for compensating includes a yaw rate sensor that produces a signal capable of correcting the trajectory for the curvature travel;

when a positioning of the sensor element occurs outside the center axis of the motor vehicle, the control system ascertains the misalignment angle with respect to the center axis, and the control system performs a weighting of the misalignment angle as one of a first process involving a function of weighted average values of the yaw rate sensor and a second process involving a displacement of the center axis.

8. The distance sensor according to claim 7, wherein:

the weighting occurs on the weighted average values of the first process and the second process.

9. The distance sensor according to claim 7, wherein:

quality numbers for the misalignment angle are developed from weighting factors according to the formula:

$$d_{alpha} = G1(q\_\text{traj}) * d_{alpha\_traj} + G2\,(q\_\text{obj}) * d_{alpha\_obj}$$

where $d_{alpha}$ is a currently valid misalignment angle from the center axis, $G1(q\_\text{traj})$ and $G2(q\,\text{obj})$ are weighted average values from values of one of the yaw rate sensor and an average displacement, and $d_{alpha\_traj}$ and $d_{alpha\_obj}$ are associated angles.

* * * * *

UNITED STATES PATENT AND TRADEMARK OFFICE
CERTIFICATE OF CORRECTION

PATENT NO. : 6,763,318 B1
DATED : July 13, 2004
INVENTOR(S) : Klaus Winter et al.

It is certified that error appears in the above-identified patent and that said Letters Patent is hereby corrected as shown below:

<u>Title page,</u>
Item [57], ABSTRACT,
Line 2, change "by which gnment angles" to -- by which alignment angles --.
Line 9, change "curve curvatures of the road" to -- curvatures of the road --.

<u>Column 3,</u>
Line 11, change "but rather displaced" to -- but rather is displaced --.

<u>Column 6,</u>
Line 38, change "G1 (q_traj) and G2(q obj)" to -- G1(q_traj) and G2(q_obj) --.

Signed and Sealed this

Twenty-ninth Day of November, 2005

JON W. DUDAS
*Director of the United States Patent and Trademark Office*